Aug. 27, 1963

G. B. COOKE ETAL 3,101,992

METHOD FOR MAKING CAPS

Filed Dec. 28, 1953

INVENTORS
GILES B. COOKE
WILLIAM C. RAINER

BY Cushman, Darby & Cushman

ATTORNEYS

Aug. 27, 1963

G. B. COOKE ETAL 3,101,992

METHOD FOR MAKING CAPS

Filed Dec. 28, 1953

INVENTORS
GILES B. COOKE
WILLIAM C. RAINER

BY Cushman, Darby & Cushman
ATTORNEYS

United States Patent Office 3,101,992
Patented Aug. 27, 1963

3,101,992
METHOD FOR MAKING CAPS
Giles B. Cooke and William C. Rainer, Baltimore, Md., assignors to Crown Cork & Seal Company, Inc., Baltimore, Md., a corporation of New York
Filed Dec. 28, 1953, Ser. No. 400,747
1 Claim. (Cl. 18—59)

This invention relates to closures, particularly of the crown type.

The primary object of the invention is to provide a method of making a cap having a plastic cushion sealing liner, as distinguished from a merely compressible cushion disc, e.g., of cork or cork composition.

In the sealing of beverages, particularly pressure beverages, it is important that a permanent seal, as well as complete sealing, be effected. That is, where the sealed containers are not immediately opened, it has been found that slow leakage sometimes occurs, and after long standing, the contents are impaired. This, we have observed, is principally due to small and often invisible imperfections in the sealing lips of containers, such as the glass bottles to which the crowns are applied.

The primary object of this invention is to substantially reduce leakage by providing a method of making a cap having a cushion liner which is flowable under capping pressures (about 600 to 760 pounds) to penetrate and permanently seal even the minutest crevices and irregularities which are frequently found in the sealing lips of the bottles.

The cap of the present invention has a cushion liner which is plastic and moldable from about 30° F., becoming softer with increased temperatures and is sufficiently flowable at usual crowning temperatures and pressures to seal minor irregularities and crevices in the sealing lips of bottles. Crowning temperatures may vary widely, e.g., from 30° F. to 100° F., but are usually at room temperature, and crowning pressures vary from 600 to 760 pounds, usually 760 pounds per square inch.

While the present invention is preferably used in making caps of the crown type, it can also be used in preparing caps of the screw, lug or press-on type.

In applying caps of the press-on type to seal bottles, the temperatures normally range from 40° F. to 190° F., and the pressure applied varies with the size of the cap.

The pressure employed in applying screw and lug caps is normally 25 to 40 inch pounds.

Another object of the invention is to provide a method of making a cap having a cushion liner which is adherent to the metal surface of the cap or to the lacquer coating on the interior of the cap shell.

A further object is to provide a method of making a cap having a liner which will retain its shape without distortion until subjected to crowning pressures in contact with the lip of a bottle, at which time the liner, being plastic, accommodates itself to the surface of the lip of the container and forms a permanent effective seal.

An equally important object of the invention is to provide a method of making a cap having a shallower skirt than customary in crowns, and in which the liner, itself, may be of less thickness than the conventional cork, composition cork or other cushion liners.

A further object of the invention is to provide a method of making a cap having a liner which will be inert with respect to a variety of foods and beverages and medicinals, and which will not impart taste or odor or color to the contents.

Ease of assembly is another feature of the present invention in that caps may be manufactured with considerable facility. That is, by forming the liner material into continuous sheets or strips, the liners are readily stamped out, positioned in the cap shells and molded therein by heat and pressure, using high speed machinery, to provide caps having liners which are permanently adhered to the shells and cover the entire undersurface of the top of the cap and within the confines of the cap skirt.

Referring to the drawings.

Figure 5:
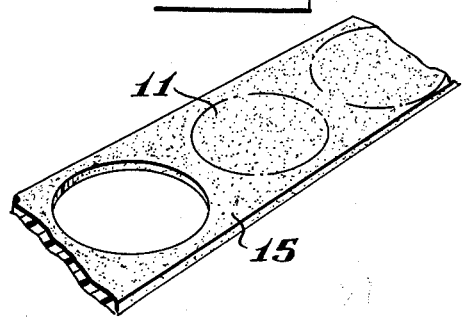
FIGURE 5 is a perspective view of a strip of the liner material showing how the disc of FIGURE 3 may be punched therefrom.
Figure 6:
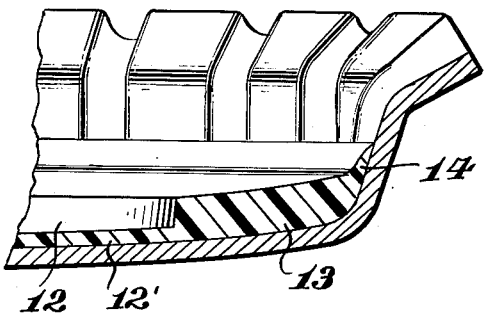
FIGURE 6 is an enlarged fragmentary section of a cap having the improved molded liner therein.
Figure 10:
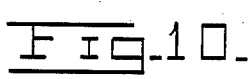
FIGURE 10 is a sectional view partly broken away of a cap, formed by molding the composite disc structure of FIGURE 8.
Figure 11:
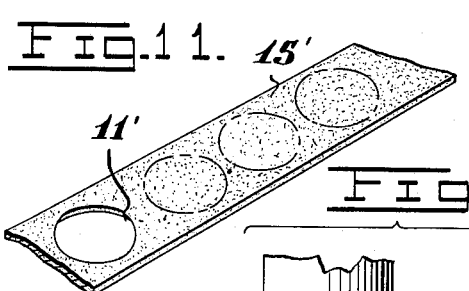
FIGURE 11 is a perspective view showing a strip from which the discs of FIGURE 9 may be punched.
Figure 12:
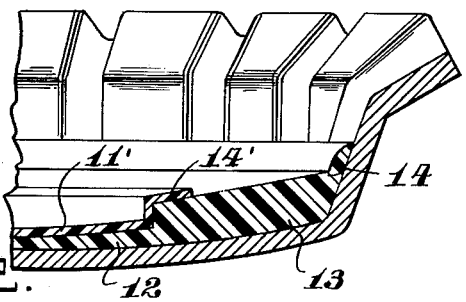
Figure 12:
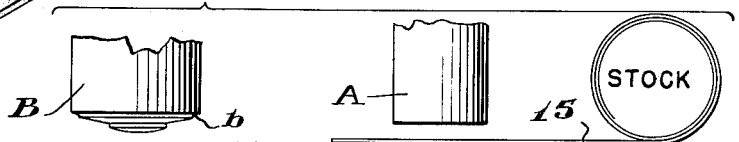
Figure 12:
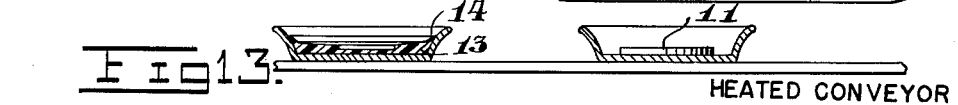
Figure 13:
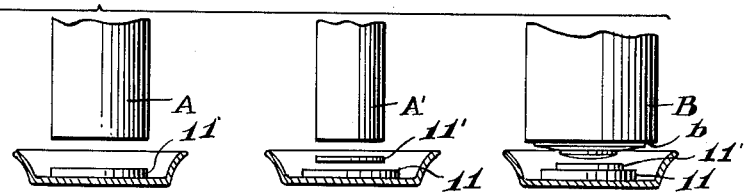

FIGURE 12 a a schematic view showing how the material of FIGURE 5 is punched out as discs which are simultaneously positioned in a cap shell and thereafter molded as shown in FIGURE 6; and FIGURE 13 shows the manner in which caps shown in FIGURE 10 are formed.

Figure 1:
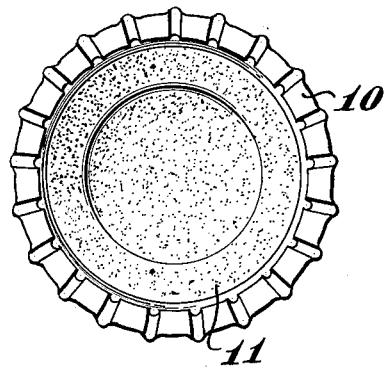
FIGURE 1 is a bottom elevation of a cap provided with the improved liner.
Figure 2:
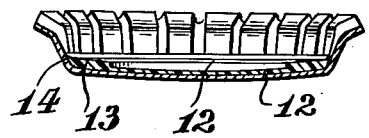
FIGURE 2 is a sectional view of the cap shown in FIGURE 1.
Figure 3:
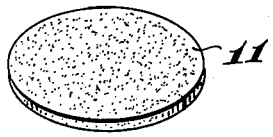
FIGURE 3 is a perspective view of a disc of the moldable liner material.
Figure 4:
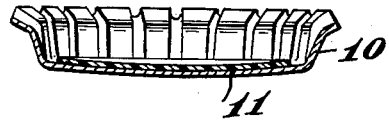
FIGURE 4 is a sectional view showing the disc of FIGURE 3 positioned in the cap and before the same is molded to form the liner shown in FIGURES 1 and 2.
Figure 7:
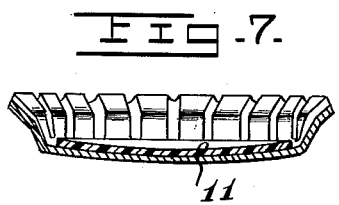
FIGURE 7 is a view similar to FIGURE 4 showing a plastic base disc in position in a cap shell.

Referring to FIGURES 1 and 2 of the drawing, the numeral 10 indicates a metal cap shell of the crown type in which has been molded a cushion liner 11 of plastic character. Referring to FIGURES 3 and 4, liner discs 11 of less diameter than that of the undersurface of the top of the crown shell are stamped by a cutting die A shown in FIGURE 12 and having a temperature of about room temperature, namely, 65° to 75° F., from a strip or sheet 15 of the liner composition shown in FIGURES 5 and 12 and simultaneously positioned and centered in the shells with a light pressure, as shown in FIGURES 4, 7 and 12, the shells being heated to render the surfaces of the discs 11 sufficiently tacky to adhere the same to the shell. Thereupon, the liners are subjected to a molding pressure of about 100 pounds to 500 pounds by means of a heated stepped molding die B, while the shells are suitably supported to avoid mutilation, and are still warm, i.e., about 200° to 300° F. The molding plunger B is also preferably operated at an elevated temperature of about 150° to 200° F. This step spreads and molds the undersize plastic disc to the shape of the interior of the cap shell and covers the undersurface of the top of the cap completely as shown in FIGURES 2 and 6. Preferably, the molding die B, as stated, has a stepped face as shown at $b$ so as to produce a liner having a central recess 12 and a relatively thicker rim 13 adjacent the skirt wall so as to provide a greater amount of liner material for engagement with a lip of a bottle to insure an adequate seal. This method also is advantageous in reducing the amount of liner material required in a disc 11, the amount of material in the center 12 of the liner constituting merely a thin coating, serving the same purpose as the well-known crown center spot, while the outer, thickened rim 13 assures thorough sealing. The plastic liner material, under usual cap sealing pressures, readily flows to penetrate and seal any crevices or irregularities in the sealing lip of a container, and the liner, as distinguished from compressible materials, has no appreciable return, i.e., it remains in the form produced by the capping operation to provide a complete leakproof seal at all times. As explained, the use of the cap for sealing purposes is not limited to use of elevated temperature, since the liner will retain its plasticity and exert its thorough sealing effect through a wide range of conditions normally encountered in bottling plants, e.g., the liner will mold itself about the sealing lip of a bottle under cap sealing pressures at temperatures as low as about 30° F. and form a permanent leakproof seal.

The surface of the liner is sufficiently firm and abrasion resistant, i.e., it is not mutilated by contact of the sharp edges of the crowns with the liners when the same are handled, as is customary in boxes containing 100 gross or more. This is an important feature of the invention in that any defacing of the sealing surface of the liner would make the appearance of the crowns objectionable.

The plasticity of the liners and their improved sealing effect can be availed of in connection with all kinds of caps, whether metal or plastic, e.g., screw caps, lug caps, as well as pressed-on caps and, in fact, caps made according to this invention form a satisfactory seal through a wide range of sealing pressures and upon all types of container sealing surfaces.

In referring to FIGURES 2 and 6, it will be noted that the liner material 12', which comprehends the recess 12 is relatively thin and is in direct contact with the undersurface of the top of the cap. Further, it will be noted that the molded liner flows upwardly of the skirt of the cap, as shown in detail in FIGURE 6 at 14.

Compositions which are suitable for producing the plastic cushion liner discs 11 in accordance with this invention are listed below:

EXAMPLE I

| | Parts |
|---|---|
| Polyvinyl chloride | 90 |
| Dicyclohexyl phthalate (plasticizer) | 124 |
| Mineral filler, e.g., clay | 125 |
| Pigment, e.g., TiO$_2$ | 2 |
| Vinyl stabilizer, e.g., NaHCO$_3$ | 1 |

Other similar compositions may be prepared by using a smaller quantity of mineral filler or by entirely eliminating the mineral filler.

EXAMPLE II

| | Parts |
|---|---|
| Polyvinyl chloride | 135 |
| Dicyclohexyl phthalate | 186 |
| Wood flour | 50 |
| Pigment, e.g., TiO$_2$ | 2 |
| Vinyl stabilizer, e.g., NaHCO$_3$ | 2 |

The quantity of wood flour or other organic filler may be increased or reduced to produce a liner having a desired degree of firmness.

EXAMPLE III

| | Parts |
|---|---|
| Vinyl chloride-vinyl acetate copolymer | 90 |
| Dioctyl phthalate | 60 |
| Butyl cyclohexyl phthalate | 30 |
| Vinyl stabilizer, e.g., NaHCO$_3$ | 1 |
| Mineral filler, e.g., clay | 50 |
| Pigment, e.g., TiO$_2$ | 2 |
| Wax (ceresin) | 1 |

For sealing certain beverages it may be desirable to have a plastic liner in which the wax content is substantially higher. Such a liner may be prepared as follows:

EXAMPLE IV

| | Parts |
|---|---|
| Polyvinyl chloride | 135 |
| Dicyclohexyl phthalate | 165 |
| Vinyl stabilizer, e.g., NaHCO$_3$ | 1 |
| Mineral filler, e.g., clay | 4 |
| Wax (ceresin) | 19 |

Compounds illustrated in the above examples may be prepared on a mill such as a rubber mill. After the ingredients are thoroughly compounded, the product may be calendered into a sheet of desired thickness and cut into ribbons, as shown in FIGURE 5, or it may be extruded in ribbon form through an extruding machine. From the ribbon, discs or wafers 11 are cut on a machine of the conventional spotting type and automatically assembled in crown shells as described above. During this assembly operation the crown shells are heated to a temperature ranging from 200° to 300° F. The punch A on the disc spotting unit is preferably kept at room temperature. These conditions permit the rapid cutting of the plastic material with no tendency to adhere to the plunger of the spot cutter A, while, at the same time, the warm crown shells soften the plastic sufficiently to insure good adhesion under the impact of the spotting plunger.

Following this operation, the warm crowns pass immediately through a molding die B which contours the liner to the desired shape, as in FIGURES 2 and 6. In this operation the crown shells with the assembled discs are kept at elevated temperature (200° to 300° F.) and the molding die B may be operated from room temperature to 200° F., depending upon the character of the particular composition.

The plastic liner may be prepared white, brown or any other desired shade.

EXAMPLE V (*White*)

| | Parts |
|---|---|
| Polyvinyl chloride | 90 |
| Dicyclohexyl phthalate | 124 |
| Talc | 125 |
| Titanium dioxide | 2 |
| Stabilizer V–1–N, a strontium containing compound described on page 32 of "Stabilizers," published by Advance Solvents and Chemical Corporation | 1 |

The reddish brown liner has the following composition:

EXAMPLE VI (*Brown*)

| | Parts |
|---|---|
| Polyvinyl chloride | 90 |
| Dicyclohexyl phthalate | 124 |
| Talc | 125 |
| Red oxide | 1 |
| Calco Oil Brown (M) | 2 |
| Stabilizer V–1–N | 1 |

In the following example, a mixture of polyvinyl chloride and a copolymer of 85% polyvinyl chloride, 14% polyvinyl acetate and 1% maleic anhydride is employed. This composition is somewhat softer than in the previous examples (lower M.P.).

EXAMPLE VII

|  | Parts |
|---|---|
| Polyvinyl chloride | 160 |
| Vinylite VMCH (copolymer), see Wakeman, "Chemistry of Commercial Plastics," page 357 | 40 |
| Dicyclohexyl phthalate | 140 |
| Butyl phthalyl butyl glycollate | 60 |
| Stannous stearate (stabilizer) | 2 |
| Calcium stearate (stabilizer) | 1 |
| Microcrystalline wax | 3 |
| Paraffin wax | 3 |
| Talc | 100 |
| Titanium dioxide | 0.25 |

Example VII, when completely assembled in the crown shell, is transparent at the center (12') and opaque in the rim 13 or thicker sealing portion. This gives the appearance of a plastic ring in the crown, the exact appearance depending upon the organic protective coating or lacquer on the metal shell.

Instead of using the vinyl copolymer in Example VII, we have found it advantageous, under certain conditions, to use a mixture of polyvinyl chloride and polyvinyl acetate.

Given below is a highly satisfactory formula in which these two types of vinyl resins have been used:

EXAMPLE VIII

|  | Parts |
|---|---|
| Polyvinyl chloride | 180 |
| Polyvinyl acetate | 20 |
| Dicyclohexyl phthalate | 140 |
| Butyl phthalyl butyl glycollate | 60 |
| Stannous stearate | 2 |
| Calcium stearate | 1 |
| Paraffin wax | 6 |
| Talc | 100 |

In the above formula, the polyvinyl acetate serves to plasticize the harder polyvinyl chloride and gives a liner of efficient sealing capacity.

The materials of the foregoing examples are compounded on a rubber mill and may be calendered or extruded to the required thickness of from about 0.030" to 0.060", preferably about 0.045". Ribbons of this thickness and 1 3/16" in width, are then passed through a crown spotting machine, as shown in FIGURE 12, having a cutting die A which cuts the discs and causes them to adhere in the pre-warmed crowns, as described above. The discs are preferably 27/32" in diameter. A molding punch B with moderate heat and pressure then forms the finished crown liner, as described.

The relatively thin liner material identified as 12' in FIGURES 2 and 6 has a thickness of about 0.005" to 0.002", preferably about 0.0010" and is substantially transparent.

This liner is formed at low pressure. The discs can be assembled and molded using conventional crown manufacturing equipment with a few mechanical adjustments. In other words, we do not need a high pressure molding machine to mold the liner in the crown or other cap.

Because of the plastic nature of the compound, it flows under crowning pressure and assumes the form of the rim of the bottle, which it seals. In other words, this liner makes every crown or cap custom built for the bottle it seals.

The above formulas show that a satisfactory plastic liner can be prepared from various combinations of polyvinyl resins. It is essential that the liner be firm and sufficiently tough to resist objectionable scratches and cuts from the edges of other crowns when packed in cartons of one hundred or more gross for shipment. It is also essential that the liners be sufficiently plastic to flow under the usual crowning pressure (76#) so that the liner will assume the form and shape of the lip of the bottle.

Figure 8:
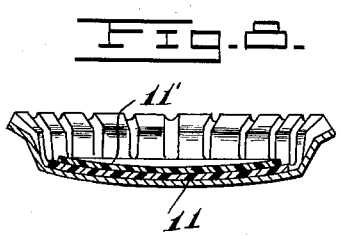
FIGURE 8 is a view similar to FIGURE 7 with another plastic layer or plastic disc superposed upon the base disc and of smaller diameter than the latter.
Figure 9:
FIGURE 9 is a perspective view of the superposed disc of FIGURE 8.

Referring to FIGURES 7 to 13, the crown having a disc 11 positioned therein, has superposed thereon a smaller disc 11' of any one of the formulations described herein, as shown in FIGURES 8 and 9, to form a composite disc shown in FIGURE 8. The discs 11 and 11' are respectively severed from a strip or sheet 15', as described above, by the cutting plungers A and A' in FIGURE 13 and then the composite disc of FIGURE 8 is acted upon by the stepped molding die B to form a cap with a composite liner, as shown in FIGURE 10, namely, with a base liner 12, 13, 14, as shown in FIGURE 6, having adhered thereto in superposed relation the plastic center spot 11'. The spot disc 11', as shown, conforms to the shape of the base liner 11 and has a circular rim 14' which overlies the inner margin of the thicker rim 13 of the base liner. The liner 11' is adhered to the base liner 11 to form in effect an integral composite liner, i.e., the soft tacky layers 11—11' are adhered together under heat and pressure as provided in the process of FIGURE 13.

Referring to FIGURES 12 and 13, it will be understood that a ribbon 15 or ribbons 15 and 15' are continuously fed to the cutting punches A and A' and the shells are continuously fed past the plungers A and B or A, A' and B so that the formation of caps in accordance with this invention will be at a high speed commercial rate similar to that at present used in making spot crowns and crowns having various types of liners therein.

As will be observed, we have provided a closure having a sealing liner 11 of a plastic composition, said liner having a central circular recess 12, the material of the liner forming the bottom wall 12' of the recess being relatively thin and comprehending an area substantially that of the container opening to be sealed, the material 13 of the liner surrounding said recess being relatively thick and comprehending an area substantially that of the sealing lip of the container, whereby to form a tight seal therewith, said plastic composition being deformable under closure-applying pressures to flow into and seal surface crevices and irregularities in said sealing lip. The closure has the bottom wall 12' of the recess 12 relatively thin so as to be substantially transparent, and the thicker or rim area 13 of the liner terminates in a continuous circumferential extension 14 adjacent the inner wall of the closure skirt. The coating 11'—14' coats the bottom and side walls of the liner recess 12 and extends into overlying relation with the adjacent inner marginal area of the thicker area or rim 13 of the liner, as shown in FIGURE 10. Instead of one of the plastic compositions described herein, the coating 11' may be of other compatible center spotting materials, e.g., aluminum foil, "express paper" and synthetic films, and suitable coatings.

We claim:

The method which comprises stamping out discs of a solid plastic composition comprising a thermoplastic vinyl chloride resin and dicyclohexyl phthalate as a plasticizer therefor and simultaneously freely positioning the same consecutively in heated closure shells, superposing a second layer of a solid plastic composition comprising a thermoplastic vinyl chloride resin and dicyclohexyl phthalate as a plasticizer therefor on the base layer, said second layer being of less area than the base layer, and thereafter subjecting said plurality of superposed layers in the form of discs while the shells containing the same are still heated by means of a stepped molding die to form a plastic liner having a central recess and a surrounding thickened deformable sealing area having a coating on the walls of the recess in said plastic liner, said coating extending into overlying relation with the marginal surface of the thickened portion of the liner surrounding said recess.

References Cited in the file of this patent

UNITED STATES PATENTS

| | | |
|---|---|---|
| 1,806,739 | Busch | May 26, 1931 |
| 2,238,681 | Dorough | Apr. 15, 1941 |
| 2,516,647 | Rogers et al. | July 25, 1950 |
| 2,543,775 | Gora | Mar. 6, 1951 |
| 2,548,305 | Gora | Apr. 10, 1951 |
| 2,654,913 | Maier | Oct. 13, 1953 |
| 2,654,914 | Maier | Oct. 13, 1953 |
| 2,663,908 | Maier et al. | Dec. 29, 1953 |
| 2,684,774 | Aichele | July 27, 1954 |
| 2,688,776 | Evans et al. | Sept. 14, 1954 |
| 2,718,323 | Kennedy | Sept. 20, 1955 |
| 2,719,564 | Schneider | Oct. 4, 1955 |